United States Patent [19]

Giard, Jr.

[11] Patent Number: 5,154,095
[45] Date of Patent: Oct. 13, 1992

[54] BICYCLE HANDLEBAR EXTENSION WITH ARM REST

[75] Inventor: Edward H. Giard, Jr., Oak park, Ill.

[73] Assignee: Profile for Speed, Chicago, Ill.

[21] Appl. No.: 718,388

[22] Filed: Jun. 20, 1991

[51] Int. Cl.$^5$ .............................................. B62K 21/12
[52] U.S. Cl. ................................... 74/551.8; 74/551.1
[58] Field of Search .................. 74/551.1, 551.2, 551.3, 74/551.8

[56] References Cited

U.S. PATENT DOCUMENTS

| | | | |
|---|---|---|---|
| 4,750,754 | 6/1988 | Lennon | 74/551.8 X |
| 4,878,397 | 11/1989 | Lennon | 74/551.1 |
| 4,930,798 | 6/1990 | Yamazaki et al. | 74/551.8 X |
| 5,000,469 | 3/1991 | Smith | 74/551.1 X |

FOREIGN PATENT DOCUMENTS 335610  10/1989  European Pat. Off. ........... 74/551.8

Primary Examiner—Allan D. Herrmann
Attorney, Agent, or Firm—Kinzer, Plyer, Dorn, McEachran & Jambor

[57] ABSTRACT

A bicycle handlebar construction provides a handlebar having first hand gripping portions and a forward extension having second hand gripping portions. There is a pair of arm rests mounted on the handlebars for support of a rider's arms when using the forward or second hand gripping portions. The arm rests are positioned a distance away from the first hand gripping portions to prevent interference therewith when the rider is using the first hand gripping portions.

21 Claims, 5 Drawing Sheets

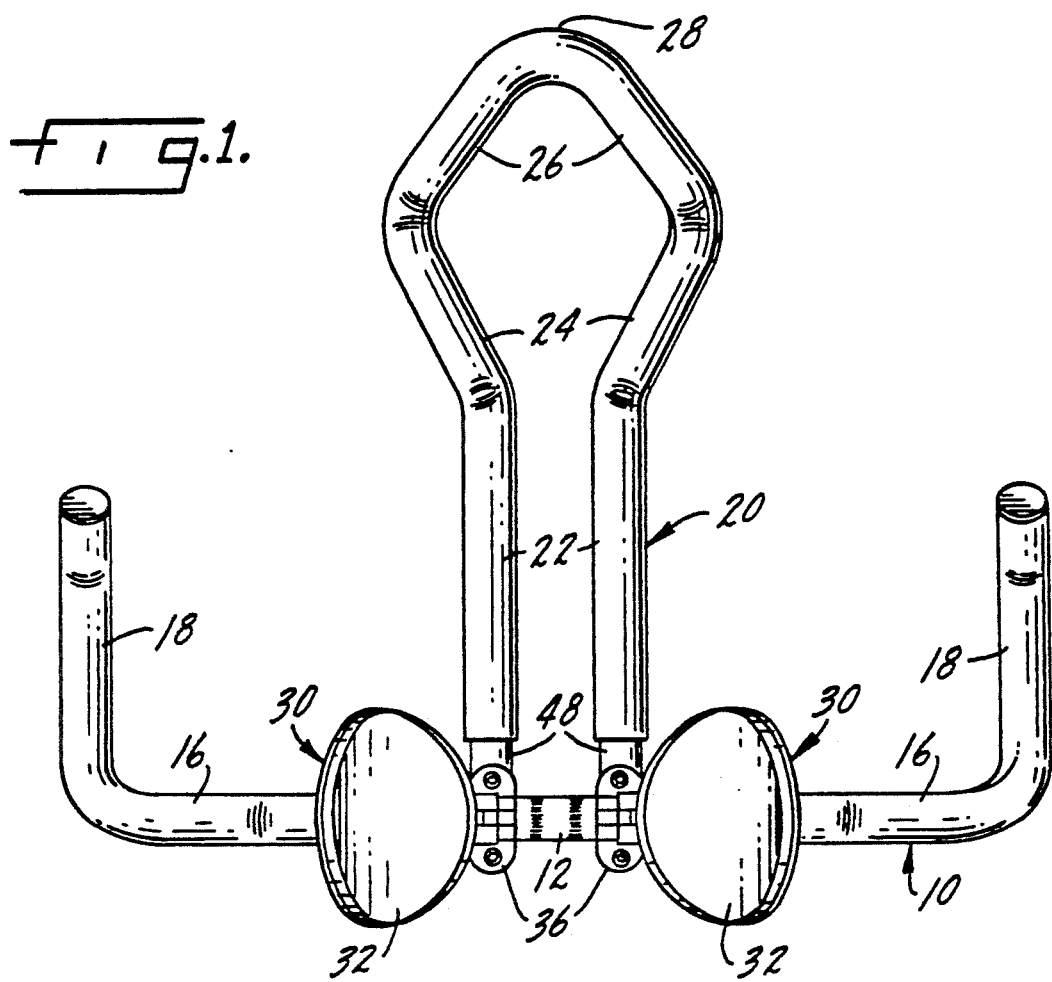
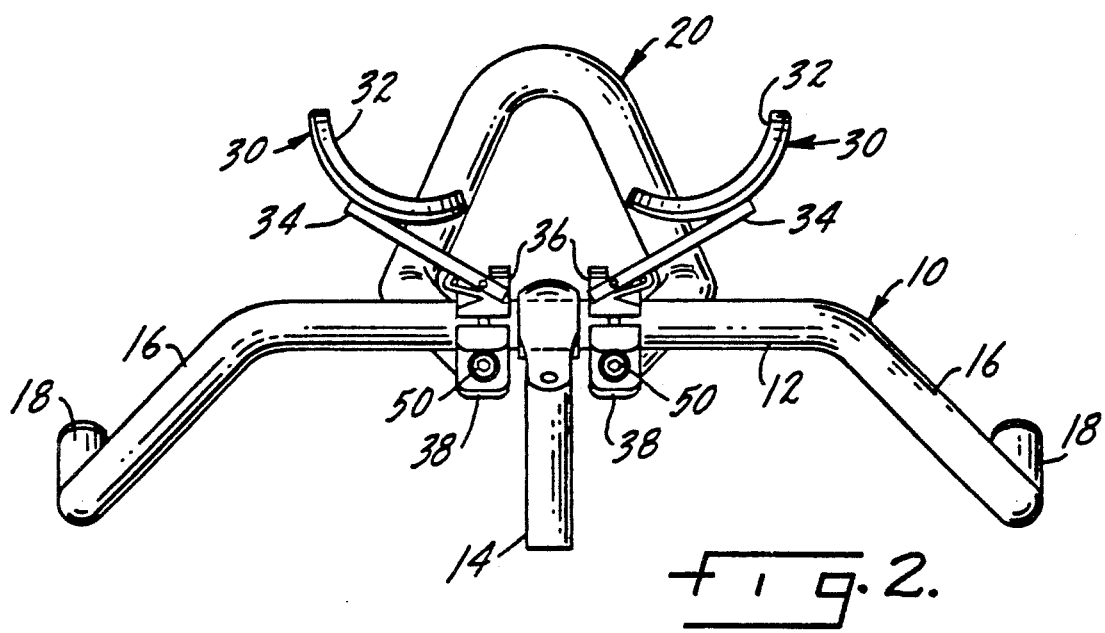

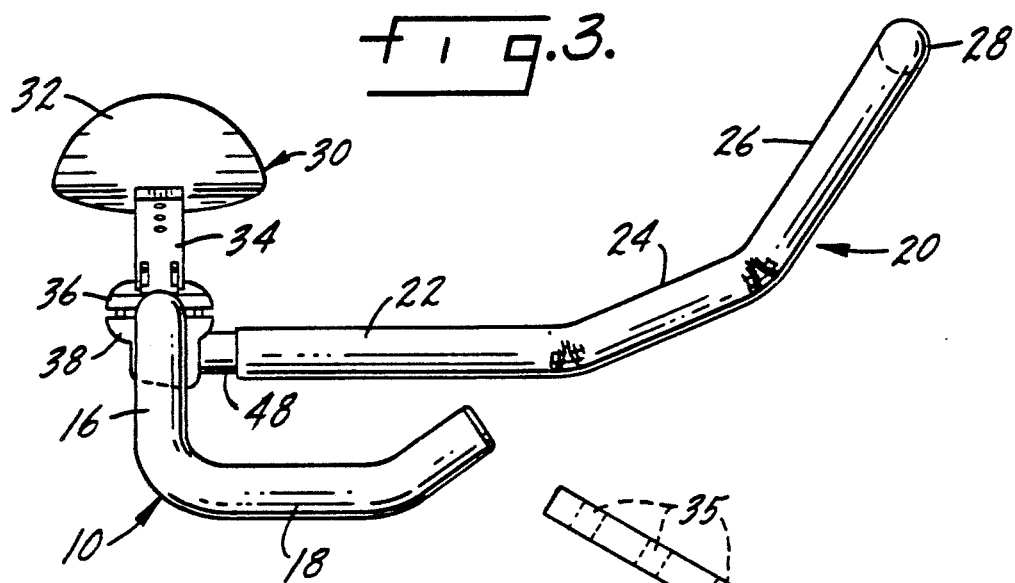
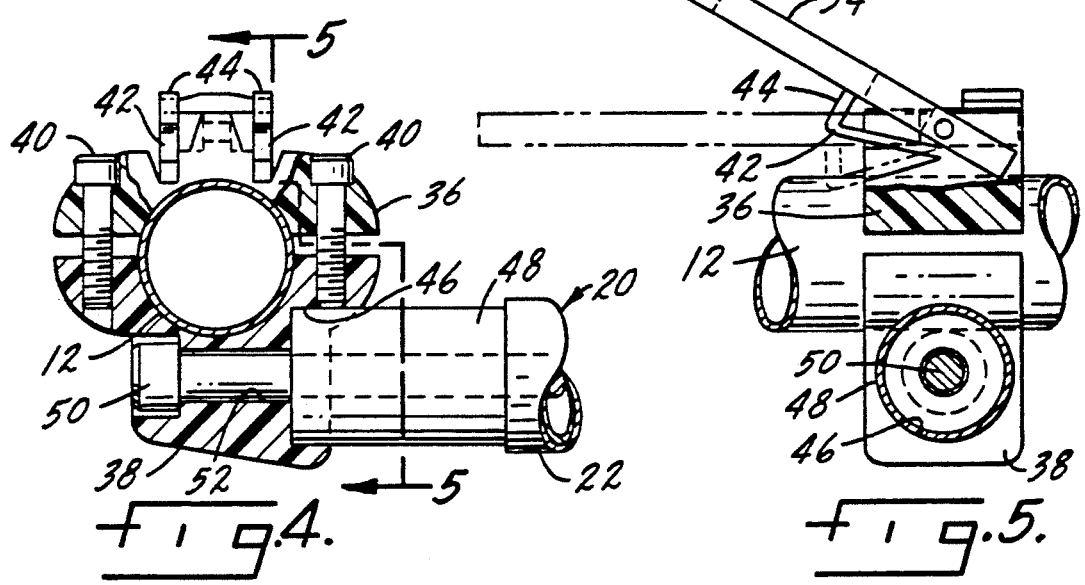
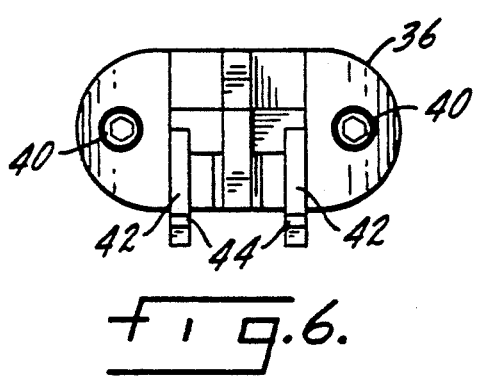
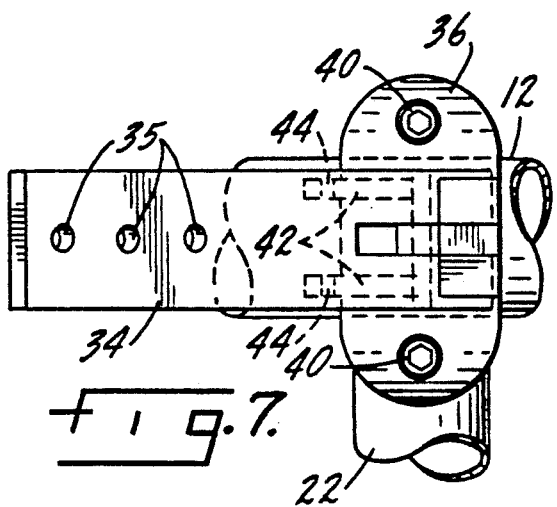

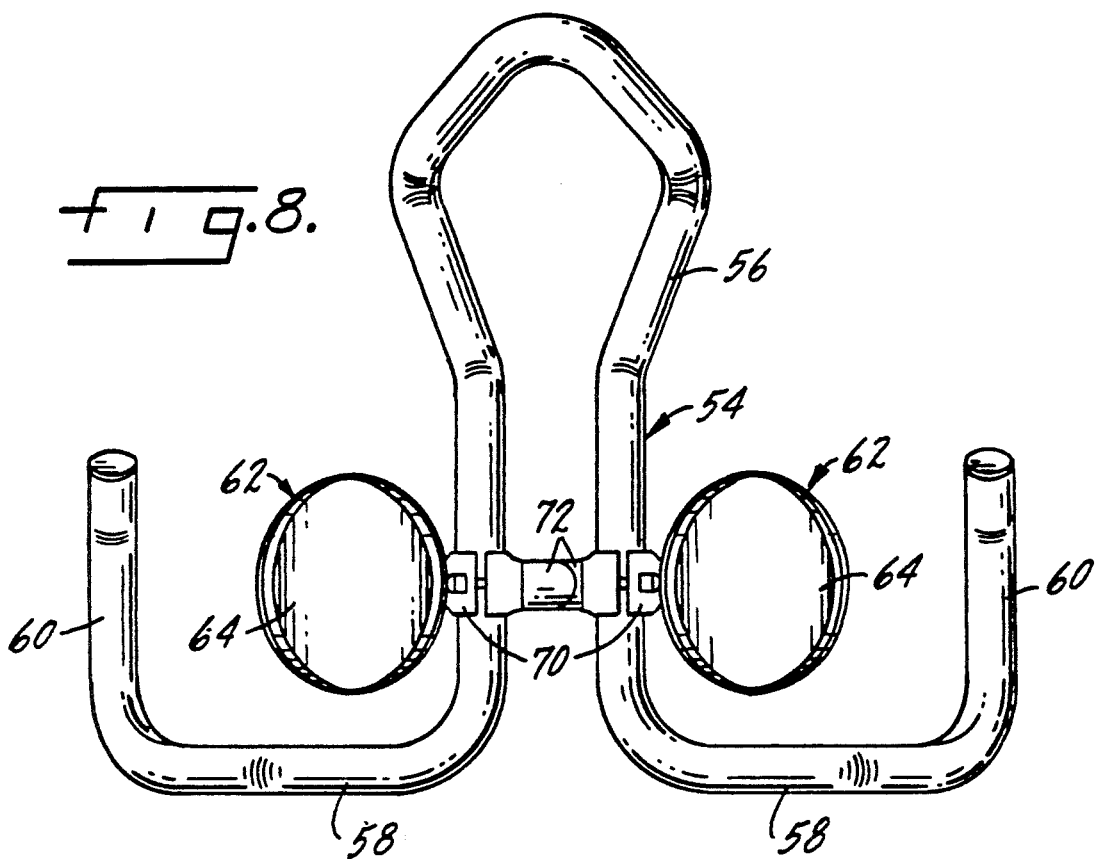
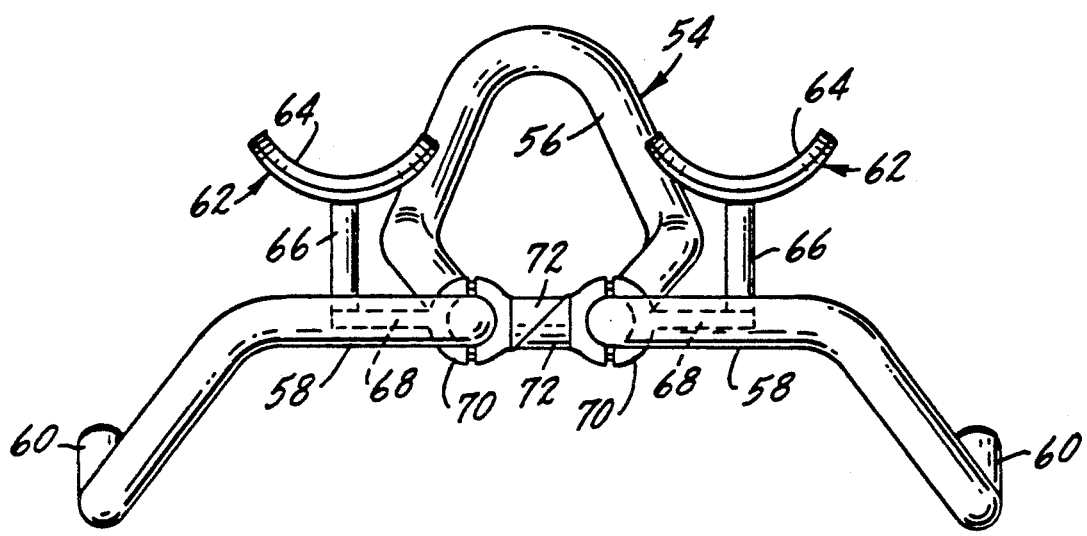

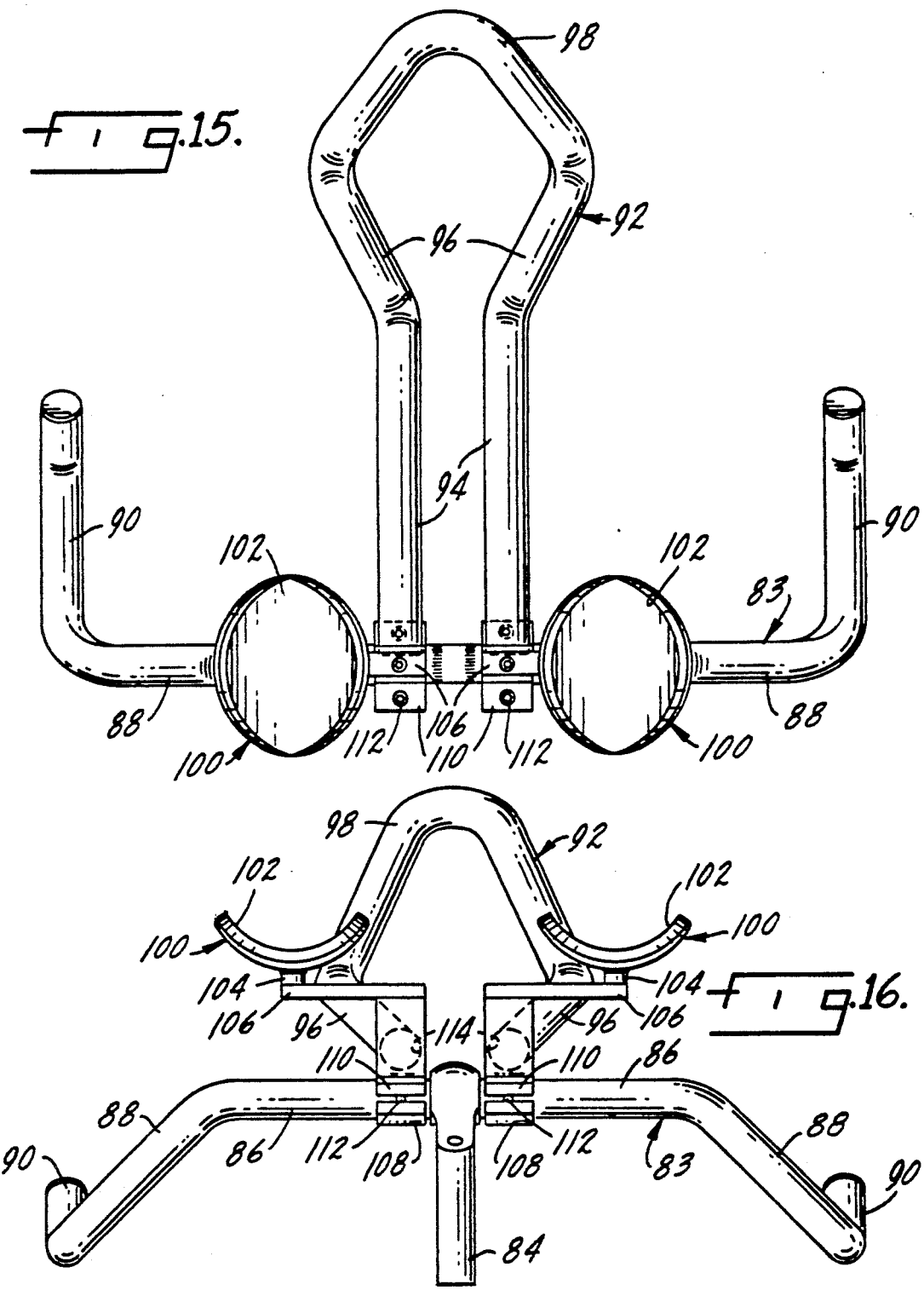

BICYCLE HANDLEBAR EXTENSION WITH ARM REST

THE FIELD OF THE INVENTION

The present invention relates to bicycle handlebars in which there is a forward extension of the bar for use when the rider wishes to assume an aerodynamic profile. Conventionally in such handlebars provision is made for the rider to rest his arms upon arm rest supports which are mounted on the handlebar in a position to support the underside of the rider's arms. When a rider does not wish to assume an aerodynamic profile, for example, when climbing, the rider normally will grip the handlebar in what is known as a "climbing" position. The present invention provides a means for mounting the arm rests so that they do not interfere with the hand position used by the rider when in a climbing mode.

DESCRIPTION OF THE RELATED ART

U.S. Pat. No. 4,878,397 shows a bicycle handlebar construction in which there is an auxiliary handlebar in the form of a forward extension which provides hand gripping portions for the rider when assuming an aerodynamic profile. This patent also shows arm rests for the rider when in that profile. The arm rests are mounted on the bicycle at approximately the area where the rider would grip the bar when in a climbing mode. The present invention positions and locates the arm rests to insure that they will not interfere with the rider's normal use of the handlebar.

SUMMARY OF THE INVENTION

The present invention relates to bicycle handlebars and in particular to the construction and mounting of arm rests for use by a rider when assuming an aerodynamic profile.

A primary purpose of the invention is a bicycle handlebar having a forward extension for use by the rider in assuming an aerodynamic profile and arm rests which are mounted for use by the rider when assuming such profile, but are so located and constructed as to not interfere with the rider's normal use of other portions of the handlebar.

Another purpose is a bicycle handlebar as described in which the arm rests are biased to a normally upward position.

Another purpose is a bicycle handlebar as described utilizing arm rests which have provision for variable location to suit the needs of a particular rider.

Other purposes will appear in the ensuing specification, drawings and claims.

BRIEF DESCRIPTION OF THE DRAWINGS

The invention is illustrated diagrammatically in the following drawings wherein:

FIG. 1 is a top plan view of the bicycle handlebar disclosed herein,

FIG. 2 is a rear view of the bicycle handlebar of FIG. 1,

FIG. 3 is a side view of the bicycle handlebar, FIG. 4 is an enlarged partial section illustrating the support bracket for the arm rest of FIGS. 1, 2 and 3, FIG. 5 is a section along plane 5—5 of FIG. 4, FIG. 6 is a top view of the arm rest support bracket with portions removed, FIG. 7 is a top view of the arm rest support bracket, FIG. 8 is a top plan view of a further embodiment of bicycle handlebar, FIG. 9 is a rear view of the bicycle handlebar of FIG. 8, FIG. 15 is a top view of a further embodiment of bicycle handlebar, and FIG. 16 is a rear view of the bicycle handlebar of FIG. 15.

DESCRIPTION OF THE PREFERRED EMBODIMENT

Figure 10:
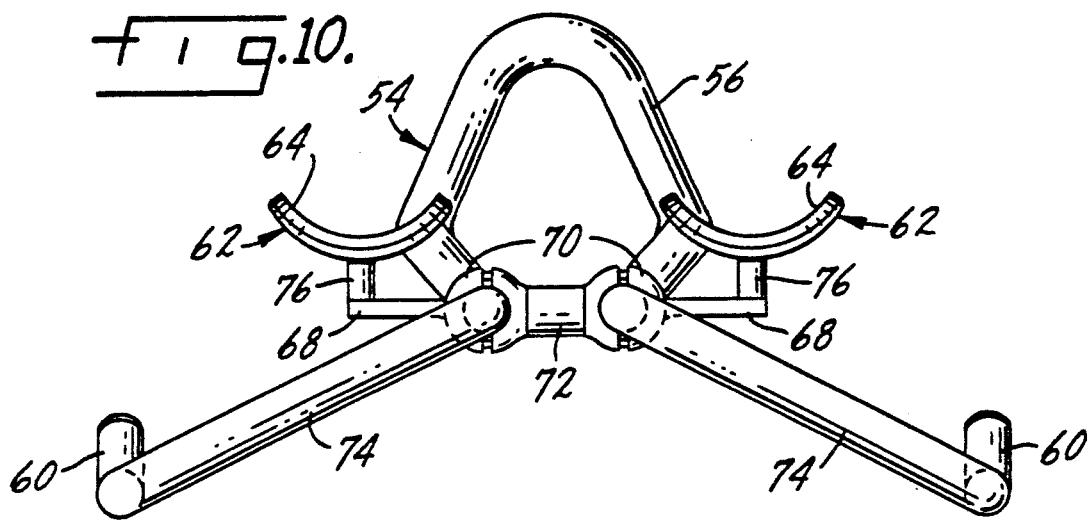
FIG. 10 is a rear view of a further embodiment of bicycle handlebar.

The present invention is specifically concerned with a bicycle handlebar which has a forward extension for use by the rider in assuming an aerodynamic profile. Such use normally requires an arm rest to support the rider in that profile. The present invention is more particularly concerned with the location, position and construction of the arm rest so as to not interfere with use of the handlebar by the rider when not in an aerodynamic profile.

In bicycle racing the rider normally assumes an aerodynamic profile, for example in a time trial, when the terrain is relatively flat and speed is the primary consideration. However, during the same race the rider may be required to cover substantial uphill terrain in which the rider will place his hands in what is known as the "climbing" position, generally adjacent and on either side of the center stem. The present invention is particularly concerned with the placement of the arm rests and the structure of the arm rests so that they do not interfere with the rider's hands when so gripping the handlebar.

In the embodiment of FIGS. 1-7, a main handlebar is indicated generally at 10 and includes a central, generally horizontal section 12 which is mounted in the bicycle center stem 14. On either side of the center section 12 are generally downturned handlebar sections 16, each of which terminate in forwardly-extending sections 18. In the normal use of the bicycle the rider may grip the forwardly-extending sections 18 or, when in a climbing mode, may grip the center section 12 on either side of the stem 14.

Extending forwardly from the main handlebar 10 is an auxiliary handlebar indicated generally at 20 which has two parallel forwardly-extending tubular portions 22. At the forward end of sections 22 there are diverging handlebar sections 24 which, as illustrated in FIG. 3, may be slightly up-turned. Extending from the diverging and up-turned sections 24 are two in-turned sections 26 which, again as shown in FIG. 3, will extend upwardly at an angle somewhat greater than that for sections 24. The handlebar sections 26 are joined together in a curved section 28 which is at the forward end of the auxiliary handlebar 20. When a rider desires to assume an aerodynamic profile, generally his hands will grip the converging and upwardly-extending sections 26.

Arm rests are mounted on the central section 12 of the main handlebar 10 generally on opposite sides of stem 14. The arm rests are indicated generally at 30 and each includes an arm rest pad 32 mounted on an arm rest support bar 34. As particularly shown in FIG. 7, the support bar 34 may have a plurality of spaced openings 35, or an elongated opening which may be used to mount arm rest pads 32, thus providing for variant positioning of the arm rest support pads.

Each of the support bars 34 is pivotally mounted to an upper support bracket 36 which, in cooperation with a lower support bracket 38, provides the means for mounting the arm rests to the central section 12 of the handlebar. Screw fasteners or the like indicated at 40, and as shown in FIG. 4, connect the upper and lower brackets 36 and 38 together on the handlebar. The upper bracket 36 may have one or more spaced cantilever spring arms 42, each of which has an up-turned portion 44 biased against the underside of support bar 34. The spring arms 42 normally urge the support bars and thus the arm rests to the full line position in FIG. 5. The dotted line position of FIG. 5 represents a lowered position of the support bar and arm rest under the conditions when the rider is placing the weight of his arms and body on the arm rests. Normally, when the arm rests are not in use, they will be urged by springs 42 to the upper fullline position of FIG. 5.

The auxiliary handlebar 20 may be attached to handlebar 12 by the use of the arm rest support brackets. As particularly shown in FIG. 4, lower support bracket 38 has a socket 46 which receives one end of an extension 48 of auxiliary handlebar 20. A threaded fastener 50 may extend through a bore 52 in bracket 38 and provides a means for varying the relative position of sleeve 48 and the auxiliary handlebar 20 to thus vary the distance at which the auxiliary handlebar extends forwardly from main handlebar 10.

In the embodiment of FIGS. 8 and 9, the auxiliary handlebar and the main handlebar are integrally formed from a single tube bent to the desired configuration. The handlebar is indicated generally at 54 and has a forward extension 56 which may have the same configuration as the auxiliary handlebar 20 in the FIG. 1-7 embodiment. The handlebar has a pair of generally horizontal diverging rear sections 58 which will provide one hand gripping position for the rider. The sections 58 terminate in forwardly-extending sections 60 similar to the sections 18 of the FIG. 1-7 embodiment.

Arm rests 62 each include arm rest pads 64 that may be mounted at the top of an upward stem 66, the stems being fastened at the outward end, as shown in FIG. 9, of a generally horizontal support arm 68. The support arm is a part of an outer bracket 70 which, together with inner brackets 72 used for both arm rests, serves to mount both arm rests and to mount the handlebar to the bicycle stem. The length of stem 66 may vary so as to vary the height at which the arm rest pads are positioned above the handlebar sections 58 which will provide the hand gripping areas for the rider during a climbing mode.

Figure 11:
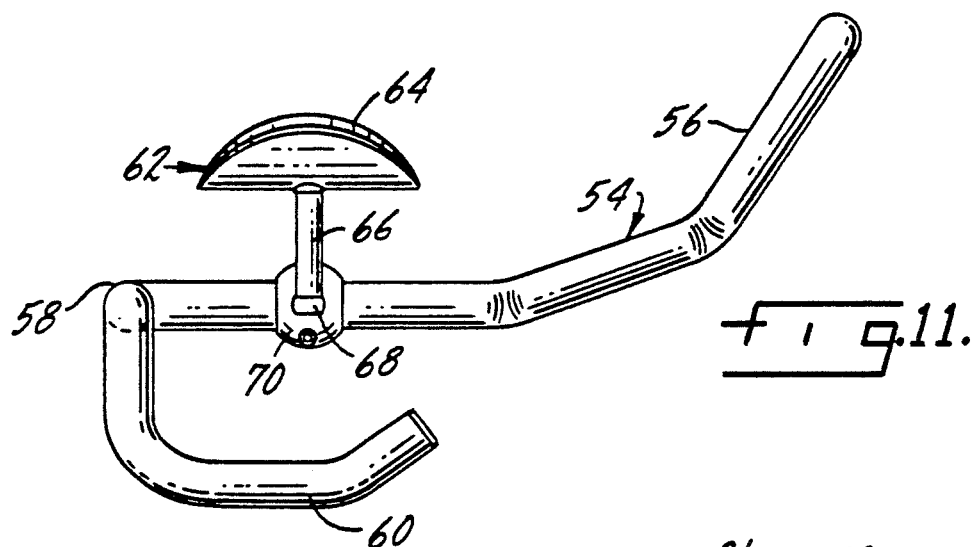
FIG. 11 is a side view of the handlebar of FIG. 9.

The embodiment shown in FIG. 10 is similar to that described in FIGS. 8 and 9, except that those portions of the bar providing the climbing mode hand gripping position, indicated at 74, have a slight downward direction in contrast with the horizontal direction of the sections 58 in FIGS. 8 and 9. The other principal difference in the FIG. 10 embodiment is that the stems 76 which mount the arm rest pads are shorter than the stem 66 in FIGS. 9 and 11, thus illustrating variant positions for the arm rest pads.

Figure 12:
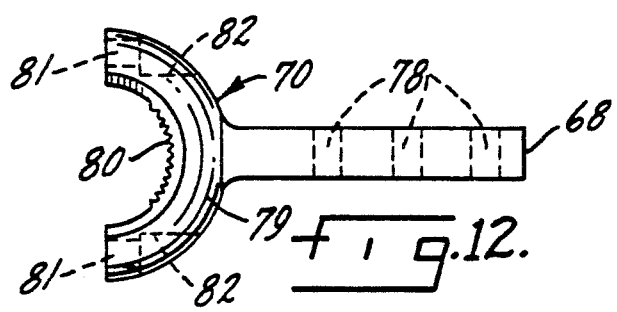
FIG. 12 is an enlarged side view of the arm rest support bracket used in the FIGS. 8, 9, 10 and 11 handlebar.
Figure 14:
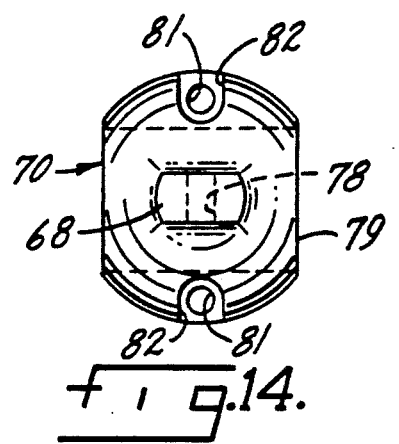
FIG. 14 is an end view of the support bracket of FIGS. 12 and 13.
Figure 13:
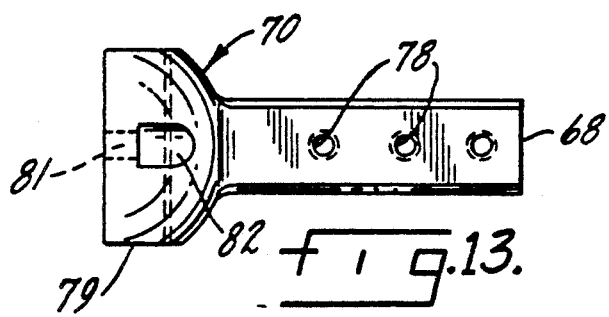
FIG. 13 is a top view of the support bracket of FIG. 12.

The outer brackets for use in mounting the arm rests shown in FIGS. 8-11 are illustrated in FIGS. 12, 13 and 14. Outer bracket 70 with its horizontally extending support bar 68 has a plurality of holes indicated at 78 for use in varying the distance at which the arm rests are positioned from the point of attachment of the bracket. The bracket has an end section 79 with an interior gripping surface 80 so that the bracket will be firmly held to the handlebar. There is a bore 81 and an adjacent recess 82 for the two fasteners which are used to hold the outer bracket 70 to an inner bracket 72.

In the embodiment of FIGS. 15 and 16, the main handlebar is indicated generally at 83 and will be attached to a central stem 84. Handlebar 83 has central sections 86 on each side of the attachment to stem 84, adjacent down-turned sections 88 and forward extensions 90 which may provide one of the hand gripping positions on the handlebar.

The auxiliary handlebar is indicated generally at 92 and may have parallel forward sections 94 adjacent the up-turned and diverging sections 96, with the auxiliary handlebar terminating in the converging and upwardly-extending sections 98 which are joined together and which each provide the forward hand gripping positions for the rider when assuming an aerodynamic profile.

The arm rests are indicated at 100 and each may include an arm rest pad 102 on a small stem 104, with the stem being attached to a support bar 106 which again may have a plurality of mounting holes for variant mounting of the arm rests. The arm rests are each mounted to the handlebar by means of a lower bracket 108 and an upper bracket 110 held together by suitable fasteners 112. The upper mounting bracket 110 may have a bore indicated at 114 which receives the mounting ends of the auxiliary handlebar 92. The auxiliary handlebar may be attached by various means to the brackets, for example by fasteners, by a press fit, or by a suitable adhesive.

Of particular importance in the present invention is the means for locating and positioning the arm rests so as not to interfere with any potential hand positions on the principal handlebar. In one form of the invention the arm rests are spring biased to an up position away from the hand gripping portion of the handlebar. In another form of the invention, the arm rests are variantly positioned, both horizontally and vertically, to suit the rider's needs and to insure that the arm rests are away from the hand positions on the handlebar. The arm rest construction may be utilized with a handlebar in which the auxiliary portion is integral with the main handlebar or with a handlebar construction in which the auxiliary handlebar is separate.

Whereas the preferred form of the invention has been shown and described herein, it should be realized that there may be many modifications, substitutions and alterations thereto.

The embodiments of the invention in which an exclusive property or privilege is claimed are defined as follows:

1. A bicycle handlebar construction including a handlebar having first hand gripping portions thereon, said handlebar construction including a forward extension having second hand gripping portions thereon, a pair of movable arm rests mounted on said handlebar construction for support of a rider's arms when using said second hand gripping portions, and spring means for normally biasing positioning said arm rests away from said first hand gripping portions to prevent interference therewith when the rider is using said first hand gripping portions.

2. The handlebar construction of claim 1 further characterized in that said forward extension is an integral part of said handlebar.

3. The handlebar construction of claim 1 further characterized by and including an auxiliary handlebar which comprises said forward extension, said auxiliary handlebar being attached to said handlebar.

4. The handlebar construction of claim 1 further characterized in that the means for normally biasing said arm rests include an upwardly-extending member for each arm rest.

5. The handlebar construction of claim 1 further characterized in that said first hand gripping portions are generally beneath said arm rests.

6. A bicycle handlebar construction including a handlebar having first hand gripping portions thereon, an auxiliary handlebar attached to said handlebar and having second hand gripping portions thereon, a pair of arm rests mounted on said handlebar adjacent said first hand gripping portions for support of a rider's arms when using said second hand gripping portions, and spring means biasing said arm rests away from said first hand gripping portions.

7. The handlebar construction of claim 6 further characterized in that said spring means includes a spring for each arm rest.

8. The handlebar construction of claim 6 further characterized by and including a bracket for mounting each arm rest, each bracket including a spring for biasing its associated arm rest away from said first hand gripping portion.

9. The handlebar construction of claim 8 further characterized by and including an arm rest support for each arm rest, with each arm rest support being attached to the arm rest and being pivotally mounted to the arm rest bracket.

10. The handlebar construction of claim 9 further characterized in that each arm rest spring is formed as a part of its associated arm rest bracket.

11. A bicycle handlebar construction including a handlebar having first hand gripping portions thereon, said handlebar construction including a forward extension having second hand gripping portions thereon, a pair of arm rests mounted on said forward extension and forwardly of said first hand gripping portions for support of a rider's arms when using said second hand gripping portions, each arm rest including an arm rest pad and an arm rest bracket, and an upwardly-extending arm rest support connecting each arm rest bracket with its associated arm rest pad, with said arm rest being positioned above and forwardly of said first hand gripping portions to prevent interference therewith when the rider is using said first hand gripping portions.

12. The handlebar construction of claim 11 further characterized in that each arm rest bracket includes a horizontally-extending arm rest support which mounts said upwardly-extending arm rest support.

13. The handlebar construction of claim 12 further characterized in that each of said horizontally-extending arm rest supports has a plurality of mounting holes for variably positioning said upwardly-extending arm rest supports.

14. The handlebar construction of claim 11 further characterized in that said forward extension is an integral part of said handlebar.

15. The handlebar construction of claim 11 further characterized by and including an auxiliary handlebar attached to said handlebar and comprising said forward extension.

16. An arm rest for use on a bicycle handlebar to support the arm of a rider when the rider is gripping a forward portion of the handlebar, said arm rest including an arm rest pad and an arm rest bracket, a support member pivotally mounted to said bracket and mounting said pad, and a spring positioned to move said support in an upward direction about said pivotal connection.

17. The bicycle arm rest of claim 16 further characterized in that said spring is positioned beneath said support member.

18. The bicycle arm rest of claim 17 further characterized in that said spring has a cantilever arm portion which extends outwardly from and is integral with said bracket, said cantilever arm portion being in contact with the underside of said support member.

19. A bicycle handlebar construction including a handlebar having first hand gripping portions thereon, said handlebar construction including a forward extension having second hand gripping portions thereon, a pair of arm rests mounted on said handlebar construction for support of a rider's arms when using said second hand gripping portions, each arm rest including an arm rest pad and an arm rest bracket mounted on said handlebar, and an upwardly extending arm rest support connecting each arm rest bracket with its associated arm rest pad, with said upwardly-extending arm rest supports positioning said arm rest pads a distance above said first hand gripping portions to prevent interference therewith when the rider is using said first hand gripping portions, each of said arm rest brackets having means thereon to mount the forward extension having said second hand gripping portions thereon.

20. The handlebar construction of claim 19 further characterized in that each of said arm rest brackets has a horizontally extending arm rest support which mounts said upwardly extending arm rest support, with said horizontally extending arm rest supports having means for variably positioning said upwardly extending arm rest supports relative to said handlebar forward extension.

21. The handlebar construction of claim 19 further characterized in that said arm rest brackets are spaced apart on said handlebar, with the space intermediate said arm rest brackets being formed and adapted to mount said handlebar construction on a bicycle stem.

* * * * *